United States Patent [19]
McGrath

[11] Patent Number: 5,184,772
[45] Date of Patent: Feb. 9, 1993

[54] MATERIAL CARTON WITH IMPROVED CLOSURE

[76] Inventor: Stephen E. McGrath, R.R. 2, Lakefield, Ontario, Canada

[21] Appl. No.: 802,292

[22] Filed: Dec. 4, 1991

[30] Foreign Application Priority Data

Apr. 29, 1991 [CA] Canada ................................ 2041426

[51] Int. Cl.⁵ .......................... B65D 5/66; B65D 5/30
[52] U.S. Cl. .................................... 229/143; 229/127; 229/148; 229/178; 229/179; 229/DIG. 4
[58] Field of Search ............... 229/127, 143, 148, 178, 229/179, DIG. 4, 189, 915, 192

[56] References Cited

U.S. PATENT DOCUMENTS

| | | | |
|---|---|---|---|
| 619,757 | 2/1899 | Johnstene et al. | 229/127 |
| 1,141,343 | 6/1915 | Jones | 229/179 |
| 2,105,057 | 1/1938 | Sharpe | 229/127 |
| 2,741,415 | 4/1956 | Meitzen | 229/179 |
| 3,381,880 | 5/1968 | Lewallen et al. | 229/179 |
| 3,727,825 | 4/1973 | Troth | 229/DIG. 4 |
| 3,883,067 | 5/1975 | McGlynn et al. | 229/179 |
| 4,201,307 | 5/1980 | Malloy | 229/189 |
| 4,236,740 | 12/1980 | Sorenson et al. | 229/143 |
| 4,911,355 | 3/1990 | Bannister | 229/143 |
| 4,919,267 | 4/1990 | Stoll | 229/915 |

Primary Examiner—Gary E. Elkins
Attorney, Agent, or Firm—Jane Parsons

[57] ABSTRACT

A reusable, recyclable carton is made from recyclable plastics material and has a closure which does not require glue, staples or other non-recyclable closing elements. The plastics material may be polyethylene. The carton is erected from a knock-down carton blank having releasable engagement tabs and slots to releasably maintain the carton in an erected condition. A two flap lid is provided, the flaps meeting on a line joining opposing walls of the carton. A flange rises from each of the opposing walls adjacent the joining line of the lid flaps. The flange is joined to its respective wall along only part of its length so that it has free ends. The flange may be bent over to overlie the lid flaps and its ends may be tucked into slots in the lid flaps for that purpose.

4 Claims, 2 Drawing Sheets

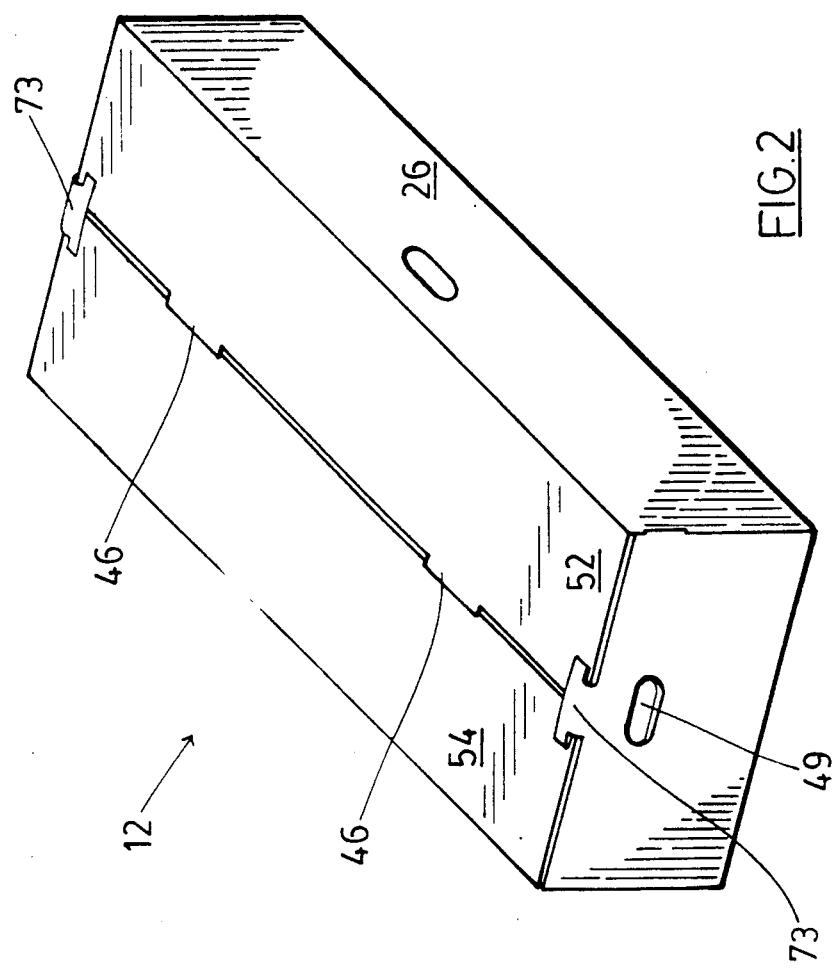

MATERIAL CARTON WITH IMPROVED CLOSURE

BACKGROUND OF THE INVENTION

1. Field of the Invention

This invention relates to reusable, recyclable plastics material cartons.

2. Acknowledgement of Prior Art

Cartons such as cartons for glassware, e.g., bottles, jars, etc., have traditionally been made of paperboard, often corrugated paperboard. When the bottles or jars contain consumables, especially food or drink, hygiene, cleanliness in packaging have been a major consideration. Possibly for this reason, packaging food and drink has been largely in inexpensive, disposable carton which need not be cleaned and re-used. Cartons which are used for returnable items, such as beer bottles are, however, subject to considerable extra stresses since they are often used by the consumer for storage and for return of the bottles. Paper, paperboard and waxed paper are examples of materials which have been used. They have, however, had some disadvantages when used for some purposes, e.g., extended storage in damp conditions.

Plastics materials are also widely used for packaging but not generally in this field. Plastics materials are used, for example, in fully flexible bags or envelopes, for wrapping sheet, for vacuum packed products, for a variety of freezer or microwave containers, for disposable flatware which is capable of limited re-use and as rigid molded containers such as carriers for soft drink bottles. Its use to replace paperboard for general carton use is notably absent. Possibly the closest use to this field is the use of foam plastics materials for food which must be kept hot.

Some of the reasons for this rather notable non-use of plastics materials are various perceived difficulties.

It is important that cartons which are intended for only one use and which, at first, are additionally used for storage and for return of returnable articles, should be inexpensive. Paperboard has remained consistently less expensive than an equivalent plastics material to give the same strength. Moreover, until relatively recently, printing onto plastics material has not been wholly satisfactory and, even now, it is necessary to take special precautions if printing on plastics material is to be hard wearing. Thus, plastics materials have not been considered practicable for disposable carton use.

There are now strong pressures on packaging suppliers to be aware of environmental considerations. One specific consideration is to reduce the actual volume of disposable material, e.g., garbage. Another consideration is to make any necessary volume of such disposable material recyclable. At least these two considerations led the inventor to attempt to provide a re-usable, recyclable packaging carton which is environmentally friendly. In attempting to produce a reusable carton, the inventor was addressing the problem of actual volume of packaging material produced which must ultimately be disposed of. In addressing the question of a recyclable carton, the inventor was addressing the question of disposal itself.

If a commonly available recycling technology is to be utilized, paperboard cartons are unsuitable for recycling due to the presence of glue, staples, wax or other contaminants. Moreover, paperboard cartons are generally utilizable only once by the supplier even if they are utilized for secondary purposes by the consumer.

The present inventor addressed the use of secondary use by the supplier. He also particularly addressed the problem of secondary use by the consumer for storage purposes and, in this connection, appreciated that the flaps of the top of a carton which formed the lid and which are glued or stapled one to another by the supplier for transport of the contents require the use of glue or staples. The present inventor addressed the problem of providing a secure lid closure without the need for glue, staples, etc.

SUMMARY OF THE INVENTION

According to the present invention, there is provided a carton formed of plastics material comprising; a carton body having a rectangular base and walls folded to the base at 90 degrees, each member of one opposing pair of walls having extension panels folded from each end at 90 degrees to be flush with and inside the other opposing pair of walls, and each member of the other opposing pair of walls having two top edge end panels folded at 180 degrees to be flush with and inside extension panels of each of the one pair of walls and a top edge elongate mid panel attached to a respective wall over a portion of its length at one edge and having free end portions; and a lid moveable between open and closed positions with respect to a carton top defined by top edges of the walls, the lid comprising a pair of rectangular lid panels having a first edge corresponding in length to a respective top edge of said one pair of walls, and joined thereto through hingable fold lines, second long edges of lid panel edges having edging panels folded thereto at right angles, the lid panels being configured such that their second long edges and edging panels abut in a closed position of the lid; releasably interengaging tabs and slots being provided between the lid panels and between top edge panels and respective extension panels, whereby on release of the tabs and slots the carton is unfoldable into a flat carton blank; in which each carton body mid panel is foldable at 90 degrees to its respective wall to overlie both lid panels in the closed position of the lid, and, when overlying the lid panels each free end of each mid-portion being engagable in a slot in a respective lid panel located for such engagement.

Also according to the invention, there is provided a carton blank of plastics material sheet foldable into a carton, and comprising; a rectangular base panel; a wall panel extending from each edge of the base panel through a fold line allowing folding of each wall panel through at least 90 degrees in either direction from the base panel, opposing wall panels being symmetrical with each other; extension panels extending from side edges of each of one opposing pair of wall panels through fold lines allowing folding of each extension panel through at least 90 degrees in either direction from the respective wall panel; two top edge panels extending from a top edge of each of the other pair of opposing wall panels through fold lines allowing folding of each top edge panel through 180 degrees in each direction from the respective wall panel and a top edge elongate mid panel attached to a respective wall over a portion of its length at one edge and having free end portions; a rectangular lid panel extending from a top edge of each of the one pair of wall panels through a fold line allowing folding of a lid panel through at least 90 degrees in each direction to the respective wall panel, the lid panels being configured to cover an area similar to that of the base panel; an edging panel extending from an edge of each lid panel remote from the fold line between the respective wall panel and the lid panel through a fold line allowing folding of the edging panel in 90 degrees in each direction to the lid panel; whereby the blank is reversibly, foldable into a carton having a rectangular base, upstanding walls and a two panel lid; releasably interengaging tabs and slots being provided for engagement of the lid panels in a closed position of the lid in the folded carton and for engagement of the top edge panels with respective extension panels in the folded carton; and the mid panel being foldable at 90 degrees to its respective wall panel to overlie both lid panels in closed position, its end portions being respectively engagable in slots of each lid panel, the slots being located for such engagement.

BRIEF DESCRIPTION OF THE DRAWINGS

An embodiment of the invention will now be described by way of example with reference to the drawings, in which:

FIG. 2 is an illustration of a folded carton according to the invention.

DETAILED DESCRIPTION OF A PREFERRED EMBODIMENT

Figure 1:
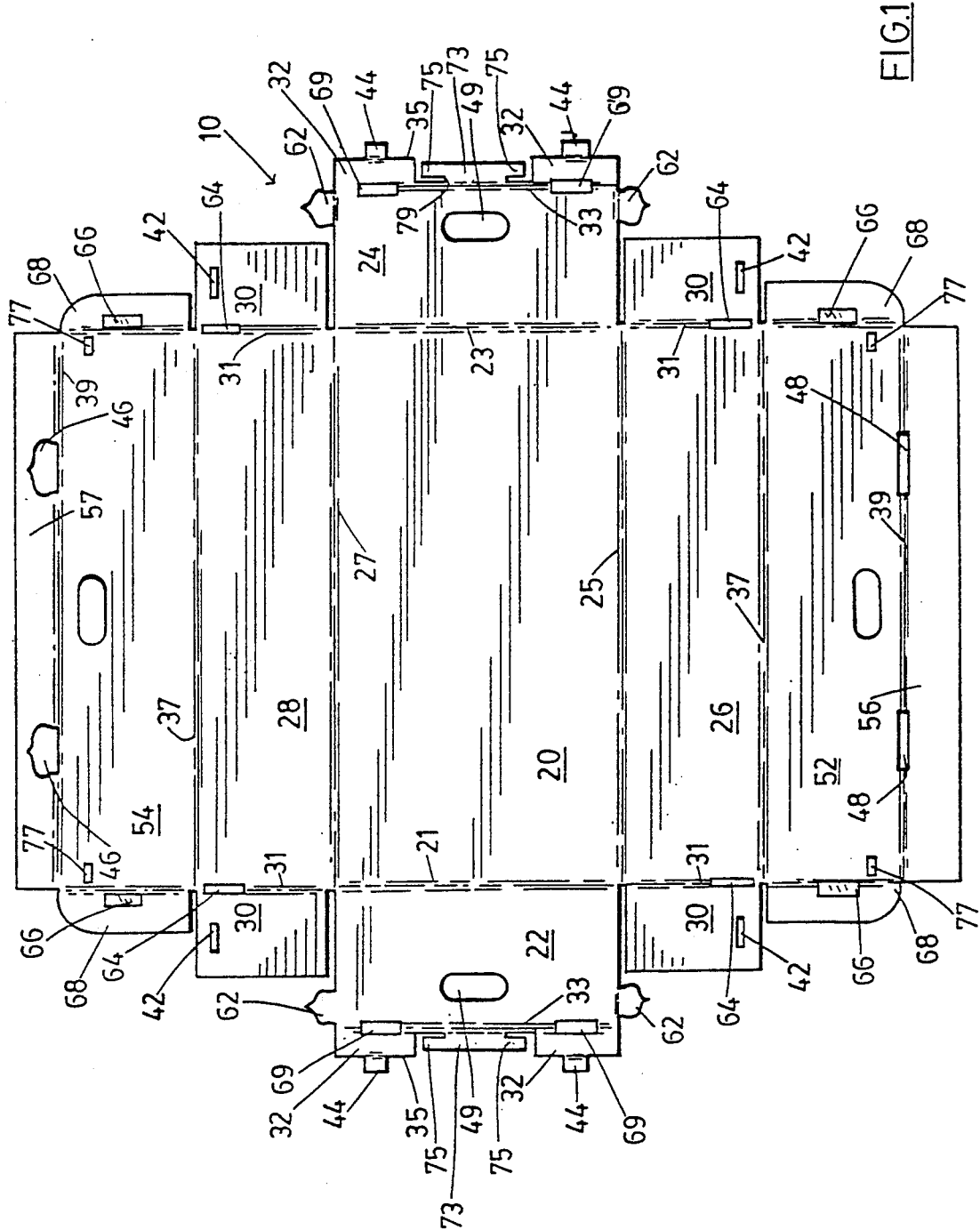
FIG. 1 is an illustration of a carton blank according to the invention.

FIG. 1 illustrates a carton blank 10 which is die stamped in a single operation from recyclable plastics material sheet.

Very suitably the plastics material may be high density polyethylene having an appropriate combination of environmental stress crack resistance (ESCR), stiffness and impact strength, which makes it suitable for use and most food, pharmaceutical, household and industrial chemical application. One suitable material is SCLAIR 58A (SCLAIR is a registered trade-mark of Dupont Canada Inc.) or PAXON B50-100 (PAXON is a registered trade-mark of Allied Corporation). Materials of this type are suitable for forming cartons of sufficient strength and stiffness while allowing provision of fold lines for the bending of panels through up to 180 degrees or even more for some panels.

For such successful recycling, it is important that additional products which would interfere with the quality of the recycled plastic material are not present. Therefore, it is of importance that glues, staples and other packaging aids such as adhesive tapes are not used. Thus the shape of the carton which allows self-interlocking without external aids is also of importance.

The carton blank 10 shown in FIG. 1 is somewhat similar to that described and claimed in copending U.S. patent application Ser. No. 802,293 to which reference is made herein so that description of the invention of that application is not made herein. The present invention is suitable for modifying cartons as described and claimed in U.S. patent application Ser. No. 802,293. The carton of FIG. 1 comprises a base panel 20 from the edges of which two pairs of opposing wall panels 22, 24 and 26, 28 extend through fold lines 21, 23 and 25, 27. The wall panels 22, 24, 26 and 28 form the walls of the carton shown in FIG. 2. In FIG. 2 only wall panels 26 and 24 are visible. The opposing wall panels 26 and 28 extending from the coined fold lines 25 and 27 along the longer edges of the rectangular base 20 have extension panels 30 joined to their side edges through fold lines 31 to form vertical corners of the carton 12.

The wall panels 22, 24 joined to the shorter edges of the rectangular base 20 through coining 21 and 23, are each provided with two top edge end panels 32 extending from the respective edge of panels 22 or 24 remote from coining 21 or 23. Top edge end panels 32 are joined to the wall panels 23, 24 through coining 33. The mid edge panel 73 is also provided between end edge panels 32. The end panels 32 may be bent over at 180 degrees to respective wall panels 22, 24 but mid edge panel 73 is for a different purpose. Mid edge panel 73 may be joined to respective wall panel 22, 24 through a short length of one elongate edge so that it is only joined to respective wall panel 22, 24 at a mid section and has free ends or tabs 75. Mid edge panel 73 may be formed by stamping or otherwise cutting a plastics material sheet. The panel 73 may conveniently be "necked" to form a T shape, the tabs 75 formed by the arms of the T and the neck being formed by the leg of the T.

The carton blank so far described is not very dissimilar from that for a paperboard beer carton except that it is formed from polyethylene sheet material and does not require the presence of glues or other means of holding the container together, even when used for full beer bottles. The structure so far described forms the carton body.

Assembly of the carton body may be by folding the wall panels 22, 24, 26 and 28 upwardly at right angles to the rectangular base panel 20. Extension panels 30 are bent inwardly at right angles about coining 31 to lie in the side wall panels 22 and 24. Coining 21, 23, 25, 27 and 31 are provided to this end. Thereafter, top edge panels 32 are bent inwardly and down at 180 degrees to lie flush with extension panels 30.

The semi-assembled carton which is obtained by bending the wall panels upwardly 90 degrees to the rectangular base panel and by bending the extension panels 30 inwardly at 90 degrees to the wall panel 26 and 28 and bending the top edge panels inwardly and downwardly at 180 degrees to wall panels 22 and 24 should now be interlocked to hold it together. For this purpose, slots 42 are provided in extension panels 30 located and oriented to cooperate with tabs 44 provided at the longer edges 35 of top edge panels 32. When carton 12 is in its semi-assembled condition, tabs 44 are engaged in a corresponding slot 42 of the respective extension panel 30. Conveniently, hand grip apertures 49 are provided in wall panels 22 and 24.

Additional locking tabs 62 and slots 64 may be provided for greater security of the erected carton 12. Thus, tabs 62 may be provided at side edges of wall panels 22, 24 to lock into slots 64 located in the coining 31 between wall panels 26, 28 and their respective extension panels. Suitably the tabs 62 have bulbous ends of greater width dimension than that of the slots 64 so that the tabs 62 once forced through the slots 64 will not easily disengage due to strong forces imposed on these.

Once the carton body has been formed, the lid may be closed by means of lid panels 52, 54 which are symmetric rectangular panels joined along their long edge to the top edges of wall panels 26, 28 through fold lines 37. The lid panels 52, 54 are of a width to meet along their long edges on the central longitudinal axis of the carton. The edging panels 56, 57 are joined to lid panels 52, 54 through coining 39. Engagement of the lid panels 52, 56 is by means of tabs 46 and 66 which are generally rectangular and are stamped out of edge panel 57 on three sides but remain joined to lid panel 54 along coining 39. The tabs 46 are engaged in corresponding slots 48 made along the coining 39 between edge panel 56 and lid panel 52. Tabs 66 are engaged in corresponding slots 69 made along the coining 33 between top edge end panels 56 and the respective wall panels.

For improved securement of the lid panels 52, 54 each mid edge panel 73 is bent over at 90 degrees so that its free ends or tabs 75 overlie respective lid panels. Slots 77 are provided in the lid panels each to engage a tab 75. When tabs 75 of one mid panel 33 are engaged in slots 77 of respective lid panels, the lid may be found to be securely fastened. Slots 77 may be located such that, when the lid panels are closed, the slots 77 are spaced apart by a distance approximately equal to the length of mid panel 33 which is attached to respective wall 22, 24.

I claim:

1. A carton formed of plastics material comprising:
   a carton body having a rectangular base with a longitudinal axis and a transverse axis; two transverse walls folded up from the base at 90 degrees, oriented parallel to the transverse axis of said base and located remotely one from the other at opposite ends of said base; two longitudinal walls folded up from the base at 90 degrees, parallel to the longitudinal axis of said base and located remotely one from the other at opposite sides of said base, each of said longitudinal walls having extension panels folded in from opposed ends thereof at 90 degrees to be flush with, and inside, the transverse walls; each of said transverse walls having two top edge end panels folded at 180 degrees to be flush with and inside said extension panels, and a top edge elongate mid panel attached to its respective wall over a portion of one longitudinal edge of said elongate mid panel and having free end portions;
   a lid movable between open and closed position with respect to a carton the lid comprising a pair of rectangular lid panels each having a first edge corresponding in length to a top edge of one of said longitudinal walls, and joined thereto through a hingable fold lien, and a second long edge opposed to said first edge, an edging panel of each of said lid panels being joined to the lid at 90 degrees through a hingable fold line at said second edge, the lid panels being configured such that said second long edges and said edging panels abut in a closed position of the lid;
   releasably inter-engaging tabs and slots being provided between said lid panels, and between each of said top edge panels with respective ones of said extension panels, whereby on release of the tabs and slots, the carton is foldable into a flat carton blank; and in which each of said mid panels is foldable at 90 degrees to its respective wall portion to overlie both lid panels in the closed position of the lid and, when overlying said lid panels each of said free ends of the mid panel is engagable in a latching slot of respective ones of said lid panels, the latching slots being located for this purpose.

2. A carton as claimed in claim 1 formed of polyethylene.

3. A flat carton blank of plastics material sheet erectable into a carton, and comprising:
   a rectangular base panel having a longitudinal axis and a transverse axis; two transverse edges oriented parallel to the transverse axis of said base and located remotely one from the other at opposite ends of said base; two longitudinal edges oriented parallel to the longitudinal axis of said base and located remotely one from the other at opposite sides of said base;
   a wall panel extending from each edge of said rectangular base through a fold line allowing folding of each wall panel through at least 90 degrees in either direction from the base panel, said wall panels comprising a pair of opposing transverse wall panels extending from the transverse edges, and a pair of opposing longitudinal wall panels extending from the longitudinal edges, each wall panel of said pair being symmetrical one with the other;
   extension panels each extending from side edges of the longitudinal wall panels through fold lines allowing folding of each extension panel through at least 90 degrees in either direction from its respective wall panel;
   two top edge end panels, each extending from a top edge of the transverse wall panels through fold lines allowing folding of each top edge panel through 180 degrees in each direction to its respective wall panel, the top edge end panels being separated by a top edge mid panel attached to the respective wall panel over a portion of its length and having free ends;
   a rectangular lid panel extending from a top edge of each longitudinal wall panel through a fold line allowing folding of a lid panel through at least 90 degrees in each direction to the respective wall panels, said lid panels being configured to cover an area similar to that of the base panel;
   an edging panel extending from an edge of each lid panel remote from the fold lien between said lid panel and its respective wall panel through a fold lien allowing folding of the edging panel in 90 degrees in each direction with respect to said lid panel;
   whereby the blank is reversibly foldable into a carton having a rectangular base, upstanding walls and a two panel lid;
   releasably interengaging tabs and slots being provided on opposing lid panels for engagement of the lid panels in a closed position of the folded carton and for engagement of the top edge panels with respective extension panels of the folded carton; and
   further slots being provided in each lid panel, each for engagement with the respective free end of the top edge mid panel of the respective end panel in a closed position of the lid.

4. A carton blank as claimed in claim 2 in which the plastics material is polyethylene.

* * * * *